US010969770B2

(12) United States Patent
Hatakeyama et al.

(10) Patent No.: US 10,969,770 B2
(45) Date of Patent: Apr. 6, 2021

(54) INSPECTION INFORMATION PREDICTION APPARATUS, INSPECTION APPARATUS, AND NON-TRANSITORY COMPUTER READABLE MEDIUM STORING INSPECTION INFORMATION PREDICTION PROGRAM

(71) Applicant: FUJI XEROX CO., LTD., Tokyo (JP)

(72) Inventors: Takashi Hatakeyama, Kanagawa (JP); Nobuhide Inaba, Kanagawa (JP); Shuhei Kobayakawa, Kanagawa (JP); Masafumi Kudo, Kanagawa (JP)

(73) Assignee: FUJI XEROX CO., LTD., Tokyo (JP)

( * ) Notice: Subject to any disclaimer, the term of this patent is extended or adjusted under 35 U.S.C. 154(b) by 15 days.

(21) Appl. No.: 16/255,840

(22) Filed: Jan. 24, 2019

(65) Prior Publication Data

US 2020/0096979 A1 Mar. 26, 2020

(30) Foreign Application Priority Data

Sep. 25, 2018 (JP) ............................ JP2018-178537

(51) Int. Cl.
*G05B 19/418* (2006.01)

(52) U.S. Cl.
CPC .................. *G05B 19/41875* (2013.01); *G05B 2219/32194* (2013.01)

(58) Field of Classification Search
CPC ................ G05B 19/41875; G05B 2219/32194
See application file for complete search history.

(56) References Cited

U.S. PATENT DOCUMENTS

2003/0209601 A1* 11/2003 Chung .................... H04L 63/12 235/385
2005/0159835 A1* 7/2005 Yamada ................. G06Q 10/06 700/109
2014/0160496 A1* 6/2014 Su ........................ G01B 5/0002 356/625
2016/0146589 A1* 5/2016 Jonas .................. G01B 21/045 33/503

FOREIGN PATENT DOCUMENTS

JP 2005197323 7/2005
JP 4495960 7/2010

* cited by examiner

*Primary Examiner* — Thomas C Lee
*Assistant Examiner* — Charles Cai
(74) *Attorney, Agent, or Firm* — JCIPRNET

(57) ABSTRACT

An inspection information prediction apparatus includes an environment-information acquisition unit that acquires environment information of a routing step through which an inspection target has been routed before an inspection step of inspecting the inspection target, a manufacturing-information acquisition unit that acquires manufacturing information of the inspection target, and a prediction unit that predicts inspection information which indicates an inspection result of an inspection portion of the inspection target determined by the manufacturing information and is obtained by applying the environment information, based on the manufacturing information of the inspection target and the environment information of the routing step through which the inspection target has been routed.

20 Claims, 12 Drawing Sheets

MATERIAL SECTION
CONTROL DEVICE
PROCESSING SECTION
CONTROL DEVICE
STORAGE SECTION
CONTROL DEVICE
CPU
ROM
INSPECTION CONTROL PROGRAM
RAM
I/O
SENSOR
INSPECTION SECTION 1
2
3
30
32
10(12)
42
52
62
4
4-k
4-2
4-1
40-1
MATERIAL SECTION
CONTROL DEVICE
10
5
5-m
5-2
5-1
50-1
PROCESSING SECTION
CONTROL DEVICE
12
6
6-n
6-2
6-1
60-1
STORAGE SECTION
CONTROL DEVICE
12
7
8
80
81
83
83P
84
85
86
87
88
82
CPU
ROM
INSPECTION CONTROL PROGRAM
RAM
I/O
SENSOR
12
INSPECTION SECTION

| NUMBER | TARGET | ENVIRONMENT INFORMATION | | | | MANUFACTURING INFORMATION | | DATE-AND-TIME INFORMATION | | REMARK |
|---|---|---|---|---|---|---|---|---|---|---|
| | | TEMPERATURE AND HUMIDITY | ATMOSPHERIC PRESSURE | BASE POINT | ROUTING | STRUCTURE | CONDITION | START | END | |
| 1 | PT-1 | T1, H1 | AP1 | 4-1 | PR1 | C1 | R1 | t1 | t2 | MATERIAL STEP |
| 2 | PT-1 | T2, H2 | AP2 | 3 | PR2 | - | - | t2 | t3 | MOVING STEP |
| 3 | PT-1 | T3, H3 | AP3 | 5-1 | PR3 | C2 | R2 | t3 | t4 | PROCESSING STEP |
| 4 | PT-1 | T4, H4 | AP4 | 3 | PR4 | - | - | t4 | t5 | MOVING STEP |
| 5 | PT-1 | T5, H5 | AP5 | 6-1 | PR5 | - | - | t5 | t6 | STORING STEP |
| 6 | PT-1 | T6, H6 | AP6 | 3 | PR6 | - | - | t6 | t7 | MOVING STEP |
| | PT-1 | T0, H0 | AP0 | 8 | - | C0 | R0 | t8 | - | INSPECTION STEP |

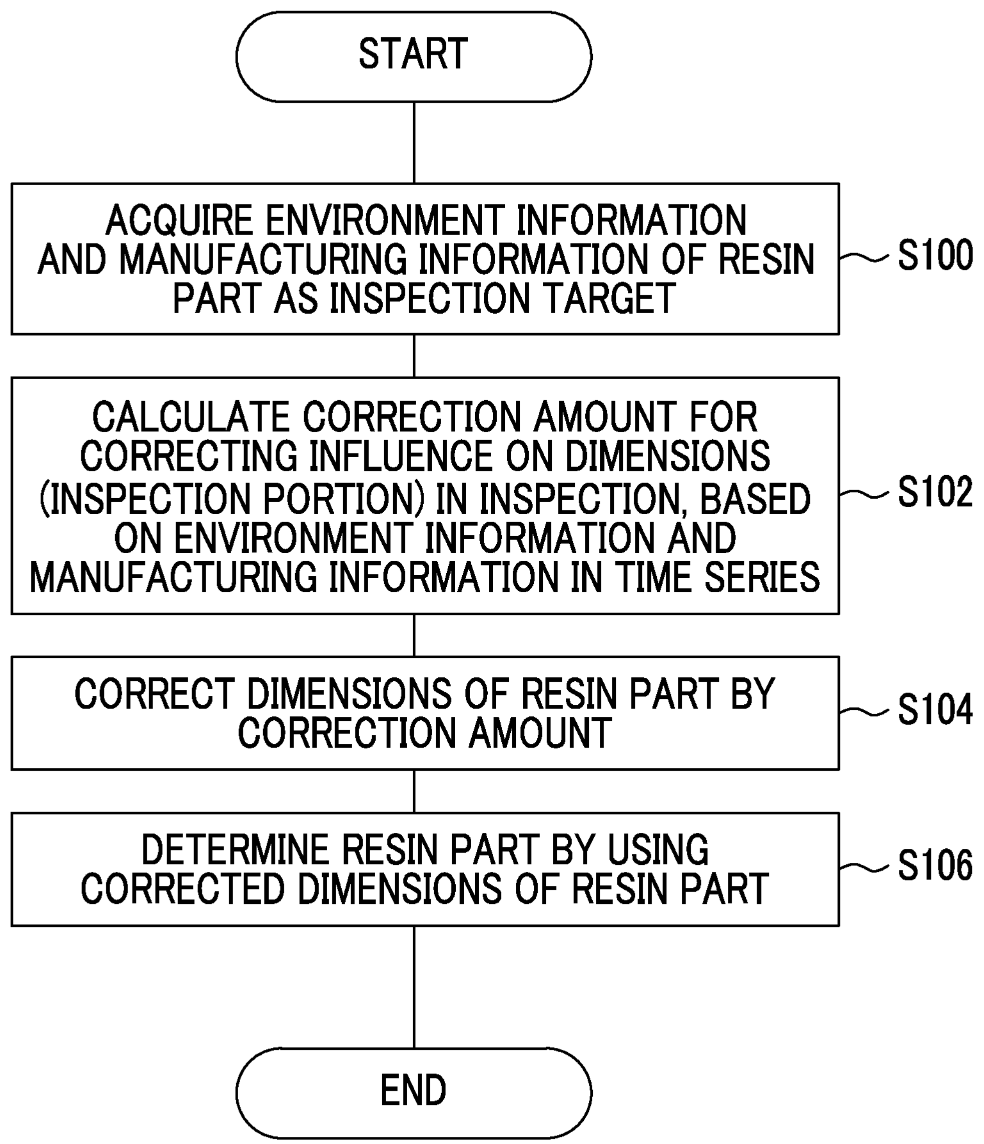
FIG. 3
START
ACQUIRE ENVIRONMENT INFORMATION AND MANUFACTURING INFORMATION OF RESIN PART AS INSPECTION TARGET
S100
CALCULATE CORRECTION AMOUNT FOR CORRECTING INFLUENCE ON DIMENSIONS (INSPECTION PORTION) IN INSPECTION, BASED ON ENVIRONMENT INFORMATION AND MANUFACTURING INFORMATION IN TIME SERIES
S102
CORRECT DIMENSIONS OF RESIN PART BY CORRECTION AMOUNT
S104
DETERMINE RESIN PART BY USING CORRECTED DIMENSIONS OF RESIN PART
S106
END 82
82A
MANUFACTURING INFORMATION BEFORE INSPECTION
82B
ENVIRONMENT INFORMATION BEFORE INSPECTION
82C
ENVIRONMENT INFORMATION IN INSPECTION
82D
MANUFACTURING INFORMATION (INSPECTION VALUE) IN INSPECTION
89
89A
HEAT CONDUCTION MODEL (INSPECTION PORTION TEMPERATURE)
89B
ANALYSIS MODEL
CORRECTION-AMOUNT CALCULATION MODEL
89C
CORRECTION AMOUNT 82
82A
MANUFACTURING INFORMATION BEFORE INSPECTION
82B
ENVIRONMENT INFORMATION BEFORE INSPECTION
82C
ENVIRONMENT INFORMATION IN INSPECTION
82D
MANUFACTURING INFORMATION IN INSPECTION
INSPECTION VALUE
INSPECTION CONDITION
89
CORRECTION-AMOUNT CALCULATION MODEL
89D
+
89E
INSPECTION VALUE AFTER CORRECTION
89F
DETERMINATION J1
J2
J3
(OK)
J4
tx
82D
89E
t8
t7
TIME
Max
INSPECTION
VALUE
(DIMENSION)

| NUMBER | TARGET | ENVIRONMENT INFORMATION | | | | MANUFACTURING INFORMATION | | DATE-AND-TIME INFORMATION | | REMARK |
|---|---|---|---|---|---|---|---|---|---|---|
| | | TEMPERATURE AND HUMIDITY | ATMOSPHERIC PRESSURE | BASE POINT | ROUTING | STRUCTURE | CONDITION | START | END | |
| 1 | PT-1 | T1, H1 | AP1 | 4-1 | PR1 | C1 | R1 | t1 | t2 | MATERIAL STEP |
| 2 | | T2, H2 | AP2 | 3 | PR2 | - | - | t2 | t3 | MOVING STEP |
| 3 | PT-2 | T3, H3 | AP3 | 4-2 | PR3 | C2 | R2 | t4 | t5 | MATERIAL STEP |
| 4 | | T4, H4 | AP4 | 3 | PR4 | - | - | t5 | t6 | MOVING STEP |
| 5 | PT-3 (1 + 2) | T5, H5 | AP5 | 5-1 | PR5 | C3 | R3 | t7 (t3, t6) | t8 | PROCESSING STEP |
| 6 | | T6, H6 | AP6 | 3 | PR6 | - | - | t8 | t9 | MOVING STEP |
| 7 | PT-3 | T7, H7 | AP7 | 6-1 | PR7 | - | - | t9 | t10 | STORING STEP |
| 8 | | T8, H8 | AP8 | 3 | PR8 | - | - | t10 | t11 | MOVING STEP |
| | PT-3 | T0, H0 | AP0 | 8 | - | C0 | R0 | t12 | - | INSPECTION STEP |

INFORMATION OF ASSEMBLY MAY HAVE FORM OF MATRIX, THAT IS, MAY INCLUDE INFORMATION OF EACH PART AND STORAGE STATE.

INSPECTION INFORMATION PREDICTION APPARATUS, INSPECTION APPARATUS, AND NON-TRANSITORY COMPUTER READABLE MEDIUM STORING INSPECTION INFORMATION PREDICTION PROGRAM

CROSS-REFERENCE TO RELATED APPLICATIONS

This application is based on and claims priority under 35 USC 119 from Japanese Patent Application No. 2018-178537 filed Sep. 25, 2018.

BACKGROUND

(i) Technical Field

The present invention relates to an inspection information prediction apparatus, an inspection apparatus, and a non-transitory computer readable medium storing an inspection information prediction program.

(ii) Related Art

When a product is manufactured, an inspection for the quality of the product is performed so as to maintain the quality of the product. In the inspection for the quality of a product, environmental conditions such as a temperature may act as disturbances and thus influence the inspection result in some cases. A technology in which, in such a case, the environmental condition and the inspection result are analyzed in association with each other, a model considering an influence of the disturbances on the inspection result is generated, and then an inspection is performed using the generated model is known. For example, a system in which process state data indicating the state of a manufacturing process of a product and an inspection result are collected, a process-quality model in which the process state data and the inspection result which have been collected are associated with each other, and it is determined whether or not the product is defective, by using the generated process-quality model (for example, see JP2005-197323A).

SUMMARY

An inspection target such as a product may be routed through plural steps before an inspection. The state of the inspection target in each of the plural steps may influence an inspection result.

Aspects of non-limiting embodiments of the present disclosure relate to an inspection information prediction apparatus, an inspection apparatus, and a non-transitory computer readable medium storing an inspection information prediction program in which it is possible to improve prediction accuracy for predicting inspection information in comparison to a case of not considering a state of an inspection target before an inspection.

Aspects of certain non-limiting embodiments of the present disclosure overcome the above disadvantages and/or other disadvantages not described above. However, aspects of the non-limiting embodiments are not required to overcome the disadvantages described above, and aspects of the non-limiting embodiments of the present disclosure may not overcome any of the disadvantages described above.

According to an aspect of the present disclosure, there is provided an inspection information prediction apparatus including an environment-information acquisition unit that acquires environment information of a routing step through which an inspection target has been routed before an inspection step of inspecting the inspection target, a manufacturing-information acquisition unit that acquires manufacturing information of the inspection target, and a prediction unit that predicts inspection information which indicates an inspection result of an inspection portion of the inspection target determined by the manufacturing information and is obtained by applying the environment information, based on the manufacturing information of the inspection target and the environment information of the routing step through which the inspection target has been routed.

BRIEF DESCRIPTION OF THE DRAWINGS

Exemplary embodiment(s) of the present invention will be described in detail based on the following figures, wherein:

FIG. 2 is an image diagram illustrating an example of inspection data including information transmitted from a manufacturing section according to the first exemplary embodiment;

FIG. 3 is a flowchart illustrating a flow of inspection processing of inspecting dimensions of a resin part according to the first exemplary embodiment;

FIG. 8 is an image diagram illustrating an example of inspection data according to the second exemplary embodiment;

DETAILED DESCRIPTION

Hereinafter, an example of an inspection information prediction system according to an exemplary embodiment of the technology in the disclosure will be described in detail with reference to the drawings. Constituent components and processing having the same actions or functions are denoted by the same reference signs in all drawings, and repetitive descriptions will be appropriately omitted in some cases.

First Exemplary Embodiment

Figure 1:
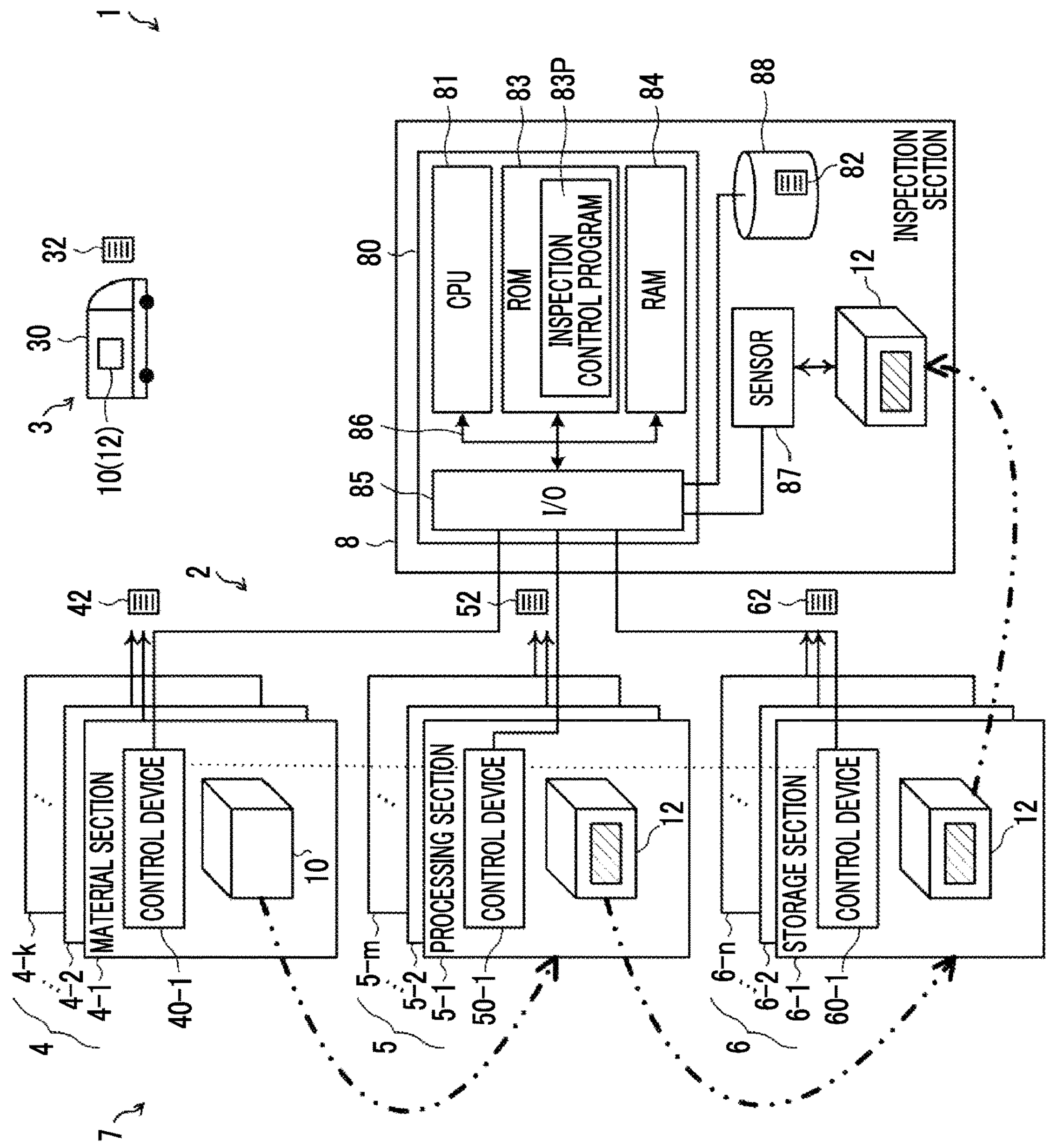
FIG. 1 is a block diagram illustrating an example of a configuration of an inspection system according to a first exemplary embodiment.

FIG. 1 illustrates an example of a configuration of an inspection system 1 according to a first exemplary embodiment.

The inspection system 1 includes a manufacturing section 7 and an inspection section 8. The manufacturing section 7 includes a material section 4, a processing section 5, and a storage section 6. The manufacturing section 7 including the material section 4, the processing section 5, and the storage section 6 is connected to the inspection section 8 via a network 2 such as the Internet and a local area network. A moving section 3 moves materials or parts in the manufacturing section 7 including the material section 4, the processing section 5, and the storage section 6 and between the manufacturing section 7 and the inspection section 8. The example illustrated in FIG. 1 shows a case where a moving object 30 such as a vehicle moves materials and parts in the moving section 3.

In the first exemplary embodiment, a case where the technology in the disclosure is applied to an inspection system in which dimensions of a resin part 12 as an example of an inspection target are inspected will be described.

In the example illustrated in FIG. 1, the material section 4, the processing section 5, and the storage section 6 function as components of the manufacturing section 7. The manufacturing section 7 represents a base point in which a manufacturing step of manufacturing an inspection target is performed in the inspection system 1. In the manufacturing section 7, the material section 4 functions as a preprocessing section of the manufacturing section 7, that performs a pre-step in the manufacturing step of the manufacturing section 7. The processing section 5 functions as a main processing section of the manufacturing section 7, that performs the main step in the manufacturing step. The storage section 6 functions as a post-processing section of the manufacturing section 7, that performs a post-step in the manufacturing step.

Specifically, the material section 4 represents a base point in which a material step of preparing a material 10 constituting at least a portion of the inspection target. In the first exemplary embodiment, an example in which the material section 4 includes the respective base point that performs the pre-step in the manufacturing step for each of plural materials which are used for forming the resin part and are the same as or different from each other will be described. For example, the material section 4 includes material sections of a first material section 4-1 to a k-th (k≥1) material section 4-*k*. The plural material sections 4-1 to 4-*k* include control devices (40-1 to 40-*k*) that manage material data 42 regarding an environmental state of each material section 4 and a manufacturing state including the composition or the structure of the material 10, respectively. The environmental state of each material section 4 includes an environmental state of the material 10. Each of the control devices 40-1 to 40-*k* which are respectively provided in the plural material sections 4-1 to 4-*k* is configured so as to be able to be connected to the inspection section 8 via the network 2. Thus, each of the control devices is capable of transmitting and receiving the material data 42 to and from the inspection section. The material section 4 transmits at least the material data 42 to the inspection section 8.

Examples of information regarding the environmental state of the material 10 in the material data 42 include environment information indicating the temperature and humidity, and atmospheric pressure for managing the material and each base point of the material section 4. The environment information may include information indicating routing of the base point of the material section 4, that is, information indicating routing as an order of the current base point through which the material 10 has been routed. Examples of the information regarding the manufacturing state of the material 10 in the material data 42 include manufacturing information indicating a material name (indicating the composition of the material 10), a color, and a weight. The material data 42 is associated with the date and time at which the material used for forming the resin part 12 has been put into the material section 4 and with the date and time at which the material has been released, in a unit of the environment information and the manufacturing information relating to the material 10.

The processing section 5 represents a base point in which a processing step of obtaining the resin part 12 by performing predetermined processing on the material 10 of the material section 4 or by performing processing on a combination of plural materials 10 is performed. In the first exemplary embodiment, an example of the processing section 5 in a case of including a base point in which the resin part 12 is formed by processing one or plural materials 10 will be described. As the processing section 5, plural processing sections 5 may be provided to correspond to different processing conditions. Plural processing sections 5 may be provided such that the resin part is capable of being formed in the common processing condition.

Specifically, the processing section 5 includes processing sections of a first processing section 5-1 to an m-th (m≥1) processing section 5-*m*. The plural processing sections 5-1 to 5-*m* include control devices (50-1 to 50-*m*) that manage processing data 52 regarding the state of the corresponding processing section 5 and resin formation, respectively. Each of the control devices 50-1 to 50-*m* which are respectively provided in the plural processing sections 5-1 to 5-*m* is configured so as to be able to be connected to the inspection section 8 via the network 2. Thus, each of the control devices is capable of transmitting and receiving the processing data 52 to and from the inspection section. The processing section 5 transmits at least the processing data 52 to the inspection section 8.

Examples of information regarding the environmental state of the processing section 5 in the processing data 52 include environment information indicating the temperature and humidity of the processing section 5, atmospheric pressure thereof, and each base point of the processing section 5. The environment information may include information indicating routing of the base point of the processing section 5, that is, information indicating routing as an order of the current base point through which the material 10 has been routed until the resin part 12 is obtained. Examples of information regarding the manufacturing state of the resin part 12 in the processing section 5, in the processing data 52, include manufacturing information. The manufacturing information indicates structural conditions indicating the shape of the resin part 12 to be formed, dimensional accuracy, the color, the strength, and the like, and processing conditions such as a processing temperature and a processing device when formation with a resin is performed. The processing data 52 is associated with the date and time at which the material has been put into the processing section 5 and with the date and time at which the part has been released after processing, in a unit of the environment information and the manufacturing information. As described above, plural processing sections 5 having different processing conditions or plural processing sections 5 having the same processing conditions may be provided such that the plural processing sections 5 form the resin parts 12 in the processing conditions corresponding to the manufacturing information.

The storage section 6 represents a base point in which a storing step of storing at least one of the material 10 of the material section 4 or the resin part 12 of the processing section 5 is performed. In the first exemplary embodiment, a case of including a base point in which at least one of the material 10 of the material section 4 or the resin part 12 of the processing section 5 is stored in a common storage condition and a base point in which at least one of the material 10 of the material section 4 or the resin part 12 of the processing section 5 is stored in different storage conditions will be described. That is, the storage section 6 stores at least one of the materials 10 or the resin part 12 in accordance with the storage condition.

For example, the storage section 6 includes storage sections of first storage section 6-1 to an n-th (n≥1) storage section 6-*n*. The plural storage sections 6-1 to 6-*n* include control devices (60-1 to 60-*n*) that manage storage data 62 regarding the environmental state of the corresponding storage section 6, respectively. Each of the control devices 60-1 to 60-*n* which are respectively provided in the plural storage sections 6-1 to 6-*n* is configured so as to be able to be connected to the inspection section 8 via the network 2. Thus, each of the control devices is capable of transmitting and receiving the storage data 62 to and from the inspection section. The storage section 6 transmits at least the storage data 62 to the inspection section 8.

The storage data 62 is information regarding a storage state of the storage section 6. Examples of the storage data include environment information indicating the temperature and humidity, atmospheric pressure, and each base point of the storage section 6, when the resin part 12 (or material 10) is stored in the storage section 6. The environment information may include information indicating routing of the base point of the storage section 6, through which the resin part 12 has been routed, that is, information indicating routing as an order of the current base point through which the material 10 has been routed. The storage data 62 is associated with the date and time at which the resin part or the material has been put into the storage section 6 and with the date and time at which the resin part or the material has been released after being stored, in a unit of the environment information. In the storage section 6, the step of storing the material 10 or the resin part 12 is performed. Thus, information regarding the manufacturing state of the resin part 12 is not desired. However, in a case where aggressive processing such as application of pressure on the resin part 12 or rapid heating and cooling is performed when the resin part is stored, the information regarding the manufacturing state may be included in the storage data 62.

The material 10 and the resin part 12 as an inspection target are moved into the manufacturing section 7 including the material section 4, the processing section 5, and the storage section 6 and between the manufacturing section 7 and the inspection section 8, by the moving section 3. In the first exemplary embodiment, movement data 32 regarding a state relating to the resin part 12 as the inspection target before an inspection, that is, regarding an environmental state of the moving section 3 is provided.

The movement data 32 is information regarding a holding state of the material 10 and the resin part 12 when the material 10 and the resin part 12 are moved by the moving section 3. Examples of the movement data include environment information indicating the temperature and humidity, atmospheric pressure, and each base point (for example, the name of the moving object 30) of the moving section 3, when the resin part 12 (or material 10) is held in the moving section 3 (for example, in the moving object 30). The environment information may include information indicating routing of the target, through which the target has been routed, that is, information indicating routing as an order of the current base point through which the target has been routed. The movement data 32 is associated with the date and time at which the target has been put into the moving section 3 and with the date and time at which the target has been released after being moved, in a unit of the environment information. In the moving section 3, the step of moving the material 10 or the resin part 12 is performed. Thus, information regarding the manufacturing state of the resin part 12 is not desired. However, in a case where aggressive processing such as application of pressure on the resin part 12 or rapid heating and cooling is performed when the resin part 12 is moved, the information regarding the manufacturing state may be included in the movement data 32.

The movement data 32 in the moving section 3 is transmitted to the inspection section 8. In this case, the moving object 30 in the moving section 3 may include a transmission device and thus transmit the movement data. The movement data may be transmitted from a management device (not illustrated) of the moving section 3, which has been sent from the moving object 30. The moving object 30 moves between the manufacturing section 7 and the inspection section 8. Thus, the movement data 32 may be transmitted to at least one base point of a base point at the departure and a base point at the arrival, and may be transmitted from the base point to which the transmission has been performed to the inspection section 8.

In the first exemplary embodiment, regarding the material section 4, a case where the first material section 4-1 functions as a base point in which the material step of preparing a resin material for a resin part is performed in a case where the resin part is set as the inspection target will be described as an example. Regarding the processing section 5, a case where the first processing section 5-1 functions as a base point in which a processing step of forming the resin part with the resin material (prepared in the material step by the first material section 4-1) is performed in a formation condition by a processing method such as injection molding will be described as an example. Regarding the storage section 6, a case where the first storage section 6-1 functions as a base point in which the storing step of storing the resin part 12 obtained by processing of the processing section 5-1 in the processing step is performed in a first storage condition will be described as an example.

In the following descriptions, in a case where descriptions of plural material sections 4 which are distinguished from each other will be desired, descriptions will be made on the assumption that the plural material sections 4 are denoted by reference signs of 4-1 to 4-*m*. However, in case where the distinguishment is not desired, the descriptions will be made on the assumption that the material sections 4 are collectively referred to as the material section 4. Similarly, in a case where descriptions of plural processing sections 5 or plural storage sections 6 which are distinguished from each other will be desired, descriptions will be made on the assumption that the processing sections 5 or plural storage sections 6 are denoted by reference signs. However, in case where the distinguishment is not desired, the descriptions will be made on the assumption that the processing sections 5 and the storage sections 6 are collectively referred to as the processing section 5 and the storage section 6, respectively.

The inspection section 8 is a base point in which an inspection target is inspected. In the first exemplary embodiment, a resin part 12 as the inspection target is inspected. The inspection section 8 includes a control device that receives material data 42 from the material section 4, the processing data 52 from the processing section 5, the storage data 62 from the storage section 6, and the movement data 32 from the moving section 3 by the manufacturing section 7, and manages the received pieces of data as inspection data 82. In the first exemplary embodiment, an example in which a single inspection section 8 is provided will be described. However, plural inspection sections 8 may be provided.

FIG. 2 illustrates an example of the inspection data 82 including information transmitted from the manufacturing section 7.

The example illustrated in FIG. 2 represents a case where pieces of data of base points through which the resin part 12 has been routed until the resin part 12 is brought into the inspection section 8 has been arranged in chronical order, in the inspection data 82. Information indicating each of a number, a target, the environment information, the manufacturing information, and the date-and-time information, and the remark is registered, as a record, in the inspection data 82 in association with each other. The number is information indicating a record. The target is information indicating the inspection target. In the example in FIG. 2, a part PT-1 corresponding to the resin part 12 is represented.

For example, a record having a number of "1" corresponds to the material data 42 from the material section 4. In this record, as environment information, the temperature in the material section 4 corresponds to T1, the humidity corresponds to H1, the atmospheric pressure corresponds to AP1, the base point corresponds to 4-1, and the pass corresponds to PR1 indicating the first pass. That is, in this record, it is shown that the first pass base point is the material section 4-1 of the material section 4, and the material section 4-1 is in an environment of the temperature T1, the humidity H1, and the atmospheric pressure AP1. In manufacturing information, it is shown that a structure corresponds to C1, and a condition corresponds to R1. For example, the manufacturing information indicates that manufacturing is performed with manufacturing C1 indicating the material name and a material condition R1 indicating the color, the weight, and the like. The date-and-time information indicates that the date and time at which the material 10 has been put into the material section 4-1 corresponds to t1, and the date and time at which the material 10 has been released from the material section 4-1 corresponds to t2. In the example illustrated in FIG. 2, in the field of the remark, information indicating a step relating to the record having a number of "1" is described. Data is appropriately stored in the field of the remark, by an input of a user. Thus, the field of the remark is not essential for the technology in the disclosure.

A record having a number of "2" corresponds to the movement data 32 from the moving section 3. The record shows that the moving section 3 is in an environment indicated by environment information in which the temperature corresponds to T2, the humidity corresponds to H2, the atmospheric pressure corresponds to AP2, the base point corresponds to the moving section 3, and the pass corresponds to PR2 indicating the second pass. The date-and-time information shows that a start corresponds to t2, an end corresponds to t3, and the moving section 3 moves the target in a period from t2 to t3.

A record having a number of "3" corresponds to the processing data 52 from the processing section 5. The record shows that the processing section 5 is in an environment indicated by environment information in which the temperature corresponds to T3, the humidity corresponds to H3, the atmospheric pressure corresponds to AP3, the base point corresponds to the processing section 5-1, and the pass corresponds to PR3 indicating the third pass. The record shows that the resin part 12 is formed by manufacturing information. The manufacturing information indicates a structural condition C2 indicating the structure of the resin part 12 to be formed, such as the shape, dimensional accuracy, the color, and strength and a processing condition R2 such as a processing temperature and a processing device when formation with a resin is performed. The date-and-time information indicates that resin forming starts from a start t3 and ends at an end t4.

A record having a number of "5" corresponds to the storage data 62 from the storage section 6. The record shows that the storage section 6 in an environment indicated by environment information in which the temperature corresponds to T5, the humidity corresponds to H5, the atmospheric pressure corresponds to AP5, the base point corresponds to the storage section 6-1, and the pass corresponds to PR5 indicating the fifth pass stores the resin part 12 in a period from a start t5 to an end t6 indicated by the date-and-time information.

Regarding the inspection data 82 illustrated in FIG. 2, a case where the environment information and the manufacturing information have been registered in association with the date-and-time information, for the inspection section 8 is described. The environment information of the inspection section 8 indicates an environment at a time point of an inspection. In FIG. 2, information of a temperature T0, humidity H0, atmospheric pressure AP0, and a base point which is the inspection section 8 is stored. The manufacturing information of the inspection section 8 indicates an inspection condition at the time point of an inspection. In FIG. 2, for example, information of a structure C0 indicating dimensions of the resin part 12 and a determination condition R0 indicating a threshold for matching determination for the structure C0 is stored. That is, in the inspection data 82, a record associated with a start t8 (t8≥t7) of the date-and-time information indicating time at which an inspection starts is added to the environment information and the manufacturing information of the inspection section 8. Thus, in the inspection data 82 illustrated in FIG. 2, it is shown that an inspection starts in the inspection section 8 under an inspection condition in an environment indicated by the environment information from the start t8.

The inspection section 8 illustrated in FIG. 1 performs inspection processing of inspecting the resin part 12 with the material data 42, the processing data 52, the storage data 62, and the movement data 32 obtained by the manufacturing section 7. FIG. 1 illustrates an example in which a performing device that performs inspection processing of inspecting the resin part 12 as the inspection section 8 is configured with a computer 80.

The computer 80 has a configuration in which a CPU 81, a ROM 83, a RAM 84, and an input and output interface (I/O) 85 are connected to each other via a bus 86. A sensor 87 for obtaining an inspection value of an inspection target and a secondary storage device 88 are also connected to the I/O 85. Further, the manufacturing section 7 is connected to the I/O 85. Specifically, the material section 4, the processing section 5, and the storage section 6 provided in the manufacturing section 7 are connected to the I/O 85.

An inspection control program 83P which is executed by the computer 80 and relates to an inspection of an inspection target is stored in the ROM 83. The CPU 81 reads the inspection control program 83P from the ROM 83 and develops the inspection control program on the RAM 84, so as to perform processing by the inspection control program 83P. Since the CPU 81 performs the processing by the inspection control program 83P, the computer 80 operates as a performing device that performs processing in the inspection section 8. The inspection control program 83P may be set to be provided by a recording medium such as a CD-ROM.

The inspection section 8 is an example of an environment-information acquisition unit, a manufacturing-information acquisition unit, and a prediction unit in the technology in the disclosure.

Next, in the inspection system 1 illustrated in FIG. 1, a state transition of a resin part 12 as an inspection target in a case where the part is inspected will be described. Here, a case where dimensions of the resin part 12 are inspected will be described.

Firstly, in the material section 4, a resin material for a resin part 12 is prepared. The resin material is moved to the processing section 5 by the moving section 3. In the processing section 5, the resin part is formed with the resin material (prepared in the material step of the by the material section 4) in a processing condition by a processing method such as injection molding. Then, the resin part is moved to the storage section 6 by the moving section 3. In the storage section 6, the resin part 12 obtained by processing in the processing section 5 is stored in the storage section 6 in a storage condition, and then is moved to the inspection section 8 by the moving section 3.

In the inspection section 8, the resin part 12 as the inspection target is inspected based on a manufacturing condition transmitted from the manufacturing section 7. As an example of the inspection step in the inspection section 8, determination processing of determining whether the dimensions of the resin part 12 are within a predetermined dimension range.

The shape of the resin part 12 has temperature dependency. Thus, the dimensions of the resin part 12 vary depending on an influence of variation in temperature. Therefore, in a case where the temperature of the resin part 12 differs from a temperature determined when the resin part 12 is inspected in the inspection section 8, the dimensions of the resin part 12 change and thus influence an inspection result. For example, in a case where the resin part has been processed in the processing step of the processing section 5, in a state of a temperature which is higher than a temperature determined in an inspection in the inspection section 8, in a case where the resin part 12 is directly moved from the processing section 5 to the inspection section 8 or is moved to the inspection section through the storage section 6 for a short period, the dimensions vary depending on a temperature difference and influence an inspection result. Even in a case where the temperature when the resin part 12 is stored in the storage section 6 differs from the temperature determined in the inspection in the inspection section 8, the dimensions vary depending on the temperature difference and influence the inspection result.

In the first exemplary embodiment, in a case where the resin part 12 is inspected, prediction processing of predicting the dimensions of the resin part 12, which correspond to inspection information, in consideration of the state of the resin part 12 as an inspection target, before an inspection, is performed. The prediction processing is included in the inspection processing performed in the inspection section 8. In the inspection section 8, it is determined whether or not the dimensions of the resin part 12 are within the predetermined dimension range, by using the predicted dimensions of the resin part 12.

Specifically, each of the material section 4, the processing section 5, and the storage section 6 provided in the manufacturing section 7 transmits environment information and the manufacturing information relating to the resin part 12, to the inspection section 8. The moving section 3 also transmits the environment information and the manufacturing information to the inspection section 8. Thus, the movement data 32, the material data 42, the processing data 52, and the storage data 62 are transmitted to the inspection section 8. In the inspection section 8, the dimensions of the resin part 12 are predicted with the environment information and the manufacturing information from the moving section 3 and the manufacturing section 7, in consideration of the state of the resin part 12 before an inspection, and it is determined whether the dimensions of the resin part 12 are within the predetermined dimension range. That is, the dimensions of the resin part in an inspection are predicted based on history of information of the step through which the resin part 12 has been routed until arriving the inspection section 8, and it is determined whether or not the dimensions of the resin part 12 are appropriate by a prediction result.

Next, details of the inspection processing of an inspection target, which is performed by the computer 80 operating as the inspection section 8 in the inspection system 1 according to the first exemplary embodiment will be described.

FIG. 3 illustrates a flow of the inspection processing of inspecting the dimensions of the resin part 12 with suppressing an influence by an environment through which the resin part 12 before the inspection has been routed. The inspection control program 83P representing the flow of the inspection processing is executed by the CPU 81 when power is put into the computer 80.

Firstly, in Step S100, environment information and manufacturing information of a resin part 12 as an inspection target are acquired from the manufacturing section 7, specifically, from each of the material section 4, the processing section 5, and the storage section 6 provided in the manufacturing section 7. In Step S100, environment information and manufacturing information of a material 10 and the resin part 12 which have been moved from the moving section 3 are also acquired.

Then, in Step S102, a correction amount for correcting an influence on dimensions in an inspection, which indicates an inspection portion of the inspection target is calculated based on the environment information and the manufacturing information in time series, which have been acquired in Step S100. In Step S102, a correction-amount calculation model 89 described below is used for calculating the correction amount for correcting the influence on the dimensions in the inspection, which indicate the inspection portion of the inspection target.

Figure 4:
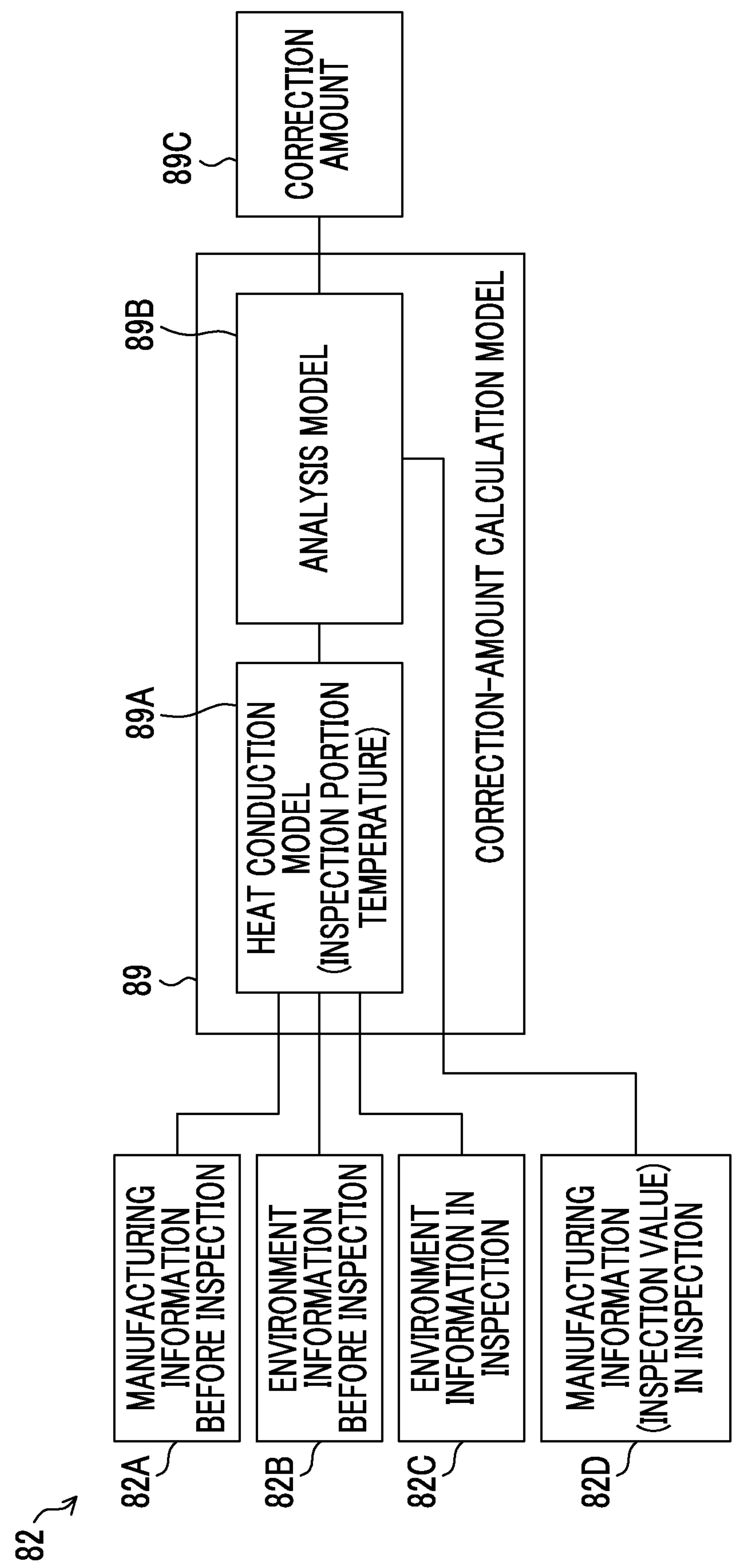
FIG. 4 is a block diagram illustrating an example of a correction-amount calculation model according to the first exemplary embodiment.

FIG. 4 illustrates an example of the correction-amount calculation model 89.

The correction-amount calculation model 89 includes a heat conduction model 89A and an analysis model 89B.

The heat conduction model 89A is, for example, a thermal circuit model. The heat conduction model is a functional unit (model) that performs a physical simulation of calculating the temperature of a resin part 12 at a time point of an inspection by using environment information and manufacturing information in the step through which the resin part 12 has been routed before the inspection. That is, the heat conduction model 89A predicts the dimensions of the resin part in the inspection, based on temporal history of the information in the steps through which the resin part 12 has been routed until arriving the inspection section 8. In other words, the heat conduction model 89A is a model that outputs predicted dimensions of the resin part 12 in an inspection by using manufacturing information 82A before the inspection, environment information 82B before the inspection, and environment information in the inspection as parameters.

The analysis model 89B performs a calculation in a manner of analyzing a change amount from the current inspection value to an inspection value in a case where the resin part 12 appropriate for the environment of the inspection section 8 in the inspection has been inspected by a well-known method such as a statistical analysis. The analysis model uses the predicted temperature of the resin part 12 and the dimensions of the resin part 12 as an inspection result. That is, the analysis model 89B performs a well-known analysis such as a statistical analysis so as to calculate the correction amount for the dimensions as the inspection result, which have been changed by an influence of the temperature. In other words, the analysis model 89B is a model that outputs the correction amount for the dimensions as the inspection result, which have been changed by an influence of the temperature, by using the predicted dimensions of the resin part 12 in the heat conduction model 89A and the inspection value in the manufacturing information 82D in the inspection, as parameters.

Then, in Step S104, the dimensions of the resin part 12 are corrected by the correction amount calculated in Step S102. In Step S106, it is determined whether the dimensions of the resin part 12 are within the predetermined dimension range, by using the corrected dimensions of the resin part 12. Then, the processing routine ends.

Figure 5:
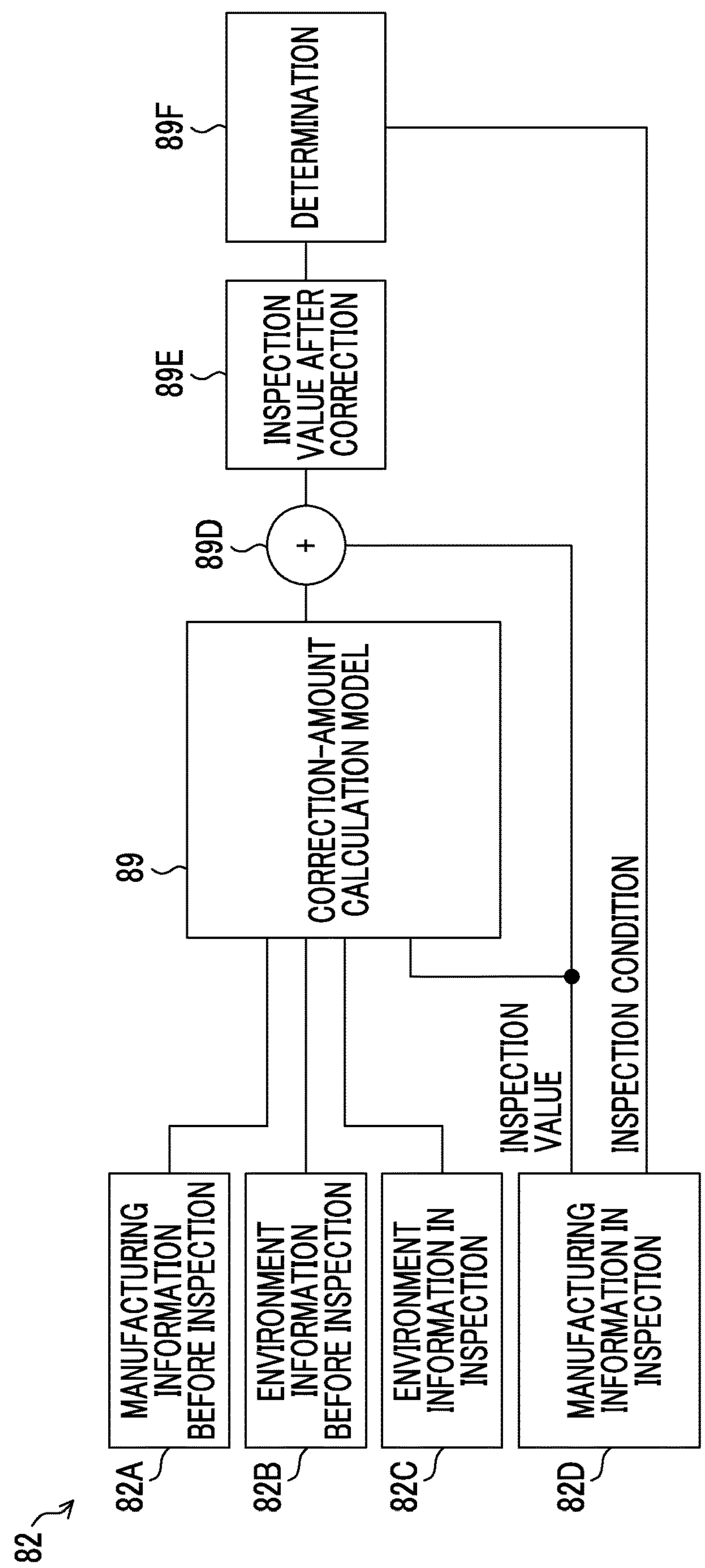
FIG. 5 is a block diagram illustrating an example of a functional configuration of determination processing of the resin part according to the first exemplary embodiment.

FIG. 5 illustrates an example of a functional configuration of the determination processing of the resin part 12 with the correction amount obtained by the correction-amount calculation model 89. The determination processing is performed by Steps S104 and S106.

The process of Step S104 corresponds to an operation of an adder 89D illustrated in FIG. 5. The adder 89D performs a correction by adding the correction amount output from the correction-amount calculation model 89 and the inspection value in the manufacturing information 82D in the inspection. The adder 89D calculates an inspection value 89E after the correction. The process of Step S106 corresponds to an operation of a determination unit 89F illustrated in FIG. 5. The determination unit 89F determines whether or not the inspection value 89E after the correction matches with the inspection condition in the manufacturing information 82D in the inspection.

In this manner, it is determined whether or not the dimensions for the resin part 12 are appropriate, by using the correction amount which is a prediction result obtained by the correction-amount calculation model 89.

Figure 6:
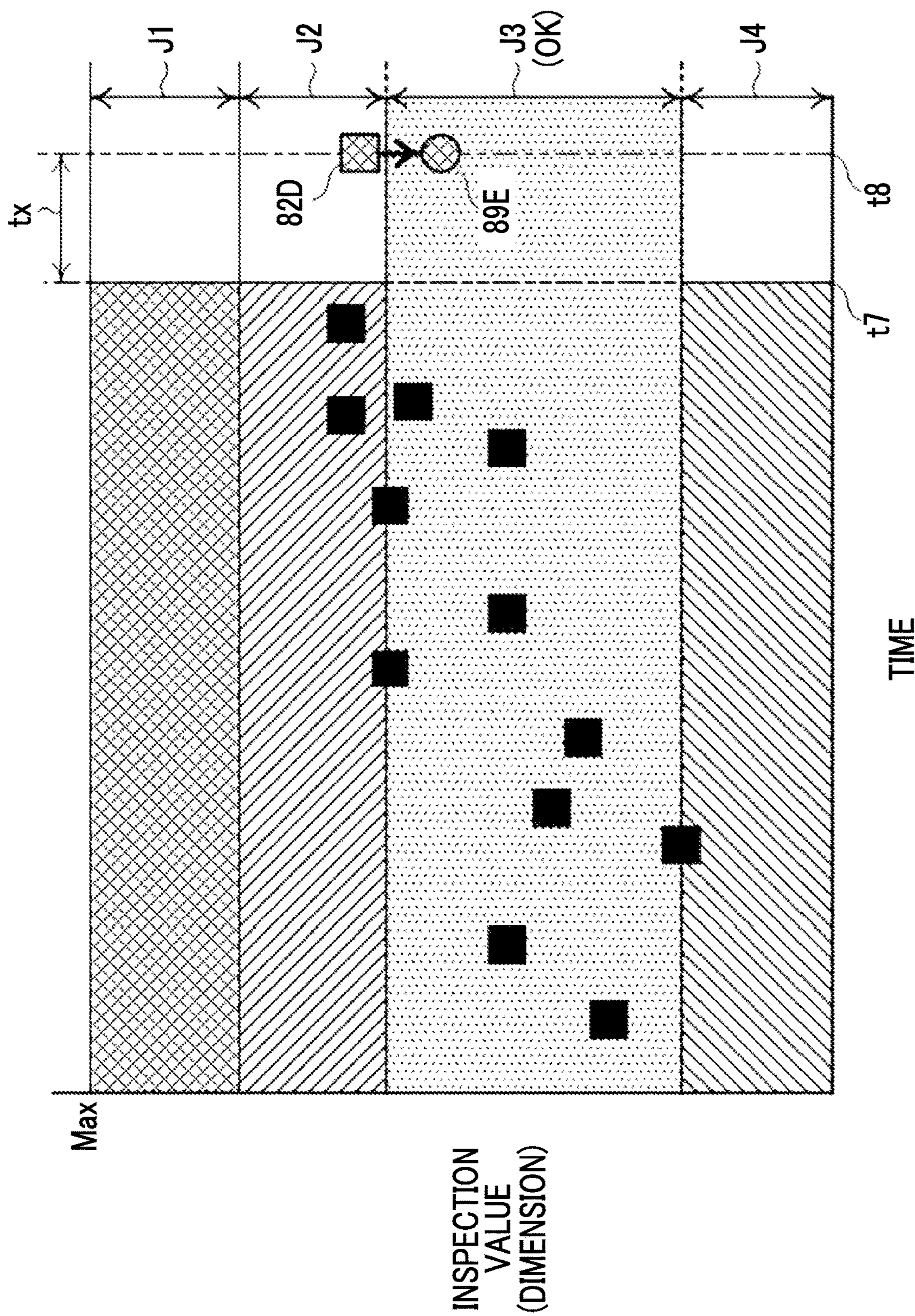
FIG. 6 is an image diagram illustrating an example of temporal characteristics regarding the dimensions of the resin part according to the first exemplary embodiment.

FIG. 6 illustrates an example of temporal characteristics relating to the dimensions of the resin part 12. In the example illustrated in FIG. 6, a case where the temperature of the resin part 12 in an inspection is not appropriate in comparison to the temperature in the inspection step in the inspection section 8, that is, the temperature of the resin part 12 in the inspection is not equal to the temperature in the inspection step will be described.

Ranges J1, J2, J3, and J4 relating to the dimensions of the resin part 12 in FIG. 6 indicate the inspection conditions in the manufacturing information 82D in the inspection, and correspond to determination criteria of the dimensions of the resin part 12. The range J1 indicates an inappropriate dimension range which means that the inspection value for the dimensions of the resin part 12 are out of a predetermined dimension range. The range J2 indicates a dimension allowable range having a possibility that the inspection value for the dimensions of the resin part 12 is out of the predetermined dimension range, but then is within the predetermined dimension range by a re-inspection. The range J3 indicates a dimension range which means that the inspection value for the dimensions of the resin part 12 is within the predetermined dimension range. The range J4 indicates a dimension range having a possibility that the inspection apparatus is in an abnormal state. Thus, the resin part 12 is accepted when the dimensions of the resin part 12 are within the range J3.

As illustrated in FIG. 6, the dimensions of the resin part 12 vary depending on a temperature difference, by the environment in the steps through which the resin part has been routed until arriving the inspection section 8. Thus, in a case where the temperature of the resin part 12 in the inspection is not equal to the temperature in the inspection step in the inspection section 8, for example, the resin part 12 is under an environment of a temperature higher than the temperature in the inspection step, the inspection value in the manufacturing information 82D in the inspection is within the range J2 which is out of the range J3. If the inspection value is used as it is, a re-inspection is desired. In the first exemplary embodiment, considering the temperature as the environmental state in the step through which the resin part 12 has been routed before the inspection, the dimensions of the resin part 12 at an inspection time point after a time point tx are predicted, that is, the predicted dimensions corresponding to the inspection value 89E after correction, which has been obtained by correcting variation of the dimensions are calculated. As described above, it is possible to correct the dimensions as the inspection result with high accuracy by predicting the temperature of a resin part 12 at an inspection time point, from history of the previous environment.

As described above, according to the first exemplary embodiment, in a case where a resin part 12 passes a routing step such as a storing step, before an inspection, it is possible to improve prediction accuracy for predicting an inspection value for inspecting the resin part 12 in an environment in the inspection, in comparison to a case where the environment in a step before the inspection is not considered.

Since the prediction accuracy for the inspection value for inspecting the resin part 12 in the environment in the inspection is improved, it is possible to improve determination accuracy of determining whether the dimensions of the resin part 12 are within a predetermined dimension range.

Second Exemplary Embodiment

Next, a second exemplary embodiment will be described. The second exemplary embodiment has a configuration which is substantially similar to that of the first exemplary embodiment. Thus, the same components are denoted by the same reference signs, and detailed descriptions thereof will not be repeated.

In the second exemplary embodiment, a case where the technology of the disclosure is applied to an inspection apparatus that performs an air leak inspection for inspecting sealability of a toner bottle provided in an image forming apparatus will be described. The toner bottle as an inspection target according to the second exemplary embodiment is formed by combining plural parts and plural materials. In the second exemplary embodiment, a case using a differential pressure leak tester as an example of the inspection apparatus that inspects sealability of the toner bottle will be described.

For example, a part for forming a toner bottle may be stored in the storage section 6 having an environment approximate to an external environment which is different from an inspection environment. Then, the part may be moved to the processing section 5 in an indoor environment which has been air-conditioned so as to pass through the processing step (assembling). Then, an air leak inspection may be performed in the inspection section 8.

An air leak inspection machine is an inspection machine that detects a pressure drop after pressurized air has been injected and measures the amount of air leaked from the sealed space. If the temperature of the toner bottle as the inspection target varies, the temperature of an air in the sealed space in the process of measuring varies, and thus pressure varies. Thus, errors occur in the measurement.

In the second exemplary embodiment, the sealability of the toner bottle is inspected with suppressing an occurrence of errors in measuring the amount of leaked air by an influence of pressure varying which occurs by the change of the temperature of the air in the sealed space of the toner bottle as the inspection target.

Figure 7:
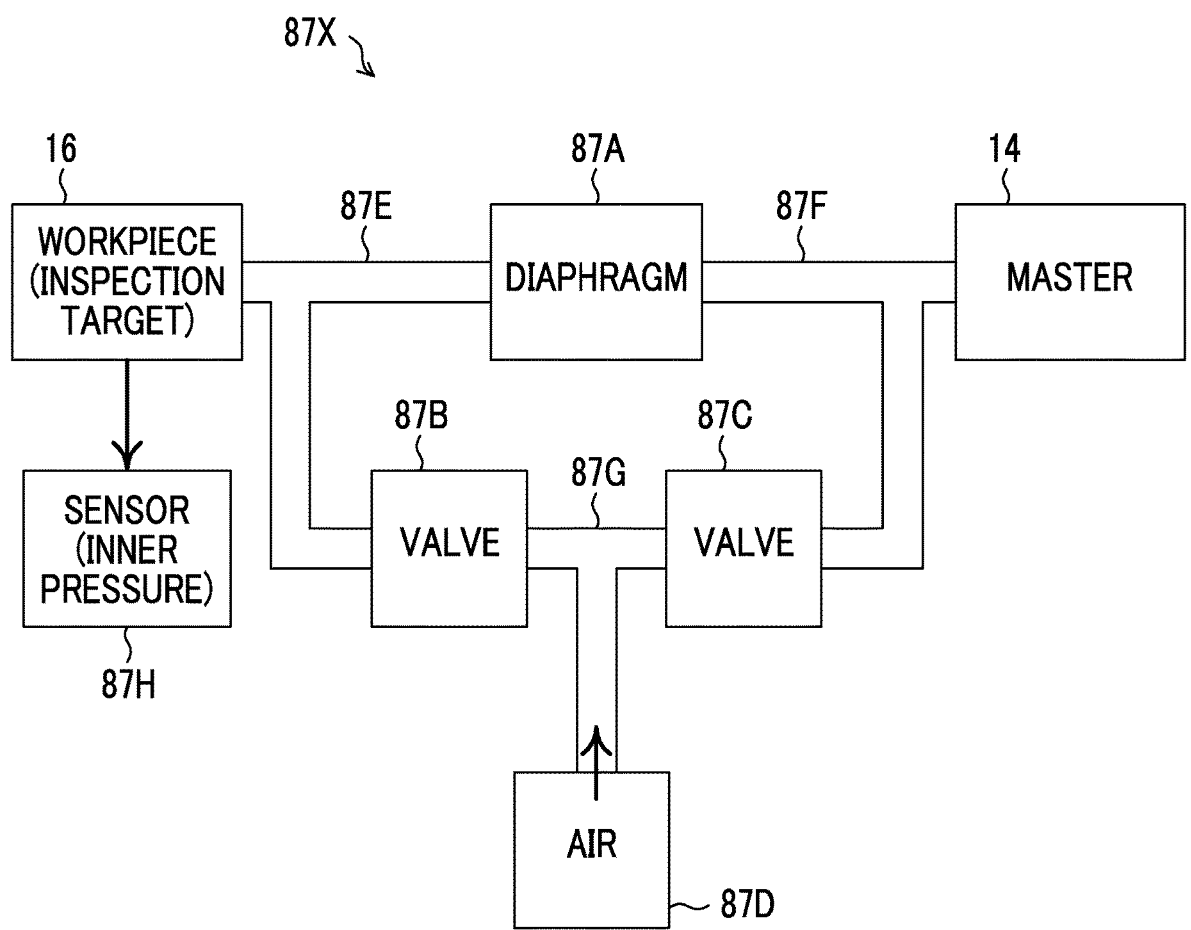
FIG. 7 is an image diagram illustrating an example of a configuration of a differential pressure leak tester according to a second exemplary embodiment.

FIG. 7 illustrates an example of a configuration of a differential pressure leak tester 87X according to the second exemplary embodiment.

The differential pressure leak tester 87X is provided in the inspection section 8 instead of the sensor 87 in the first exemplary embodiment. Specifically, the differential pressure leak tester 87X includes a diaphragm 87A, valves 87B and 87C, and an air generation source 87D. The air generation source 87D is joined to a tube 87G, the valve 87B, a tube 87E, and a toner bottle (referred to as a workpiece below) 16 as an inspection target in this order. An air generated by the air generation source 87D is supplied to the workpiece 16. The tube 87G is also joined to the valve 87C. The valve 87C is joined to a toner bottle (referred to as a master below) 14 as an inspection reference, by the tube 87F. The tube 87G causes the air generated by the air generation source 87D to be also supplied to the master 14. The tube 87E and the tube 87F are also joined to the diaphragm 87A. A sensor 87H for detecting pressure (inner pressure) in the workpiece 16 is connected to the workpiece 16.

FIG. 8 illustrates an example of inspection data 82 according to the second exemplary embodiment.

The example illustrated in FIG. 8 represents a case where pieces of data of base points through which the workpiece 16 has been routed until the workpiece 16 is brought into the inspection section 8 has been arranged in chronical order, in the inspection data 82. Regarding the inspection data 82, a case where a part PT-1 indicating a first part and a part PT-2 indicating a second part are combined so as to form a part PT-3 indicating a toner bottle, and the toner bottle is brought into the inspection section 8 as the workpiece 16 will be described.

In the second exemplary embodiment, for simplifying the following descriptions, it is assumed that the material section 4 includes a processing section for each of plural parts constituting the toner bottle. It is assumed that, in the processing section 5, the part PT-3 indicating the toner bottle is formed by assembling plural parts (PT-1 and PT-2) from the material section 4 or combining the plural parts with processing.

For example, as shown in a record which has a number of "1" and corresponds to material data 42 from the material section 4, it is shown that the part PT-1 indicating the first part receives an influence of an environment of a temperature T1, humidity H1, and atmospheric pressure AP1 in the material section 4-1, during a period from a start t1 to an end t2 indicated by date-and-time information. Regarding the part PT-1, the manufacturing information indicates that a structure corresponds to C1, and a condition corresponds to R1. As shown in a record which has a number of "2" and corresponds to movement data 32 from the moving section 3, it is shown that the part PT-1 receives an influence of an environment of a temperature T2, humidity H2, and atmospheric pressure AP2 after the material section 4-1, during a period from a start t2 to an end t3.

Similarly, as shown in a record having a number of "3", it is shown that the part PT-2 indicating the second part receives an influence of an environment of a temperature T3, humidity H3, and atmospheric pressure AP3 in the material section 4-2, during a period from a start t4 to an end t5. Regarding the part PT-2, the manufacturing information indicates that a structure corresponds to C2, and a condition corresponds to R2. As shown in a record having a number of "4", it is shown that the part PT-2 receives an influence of an environment of a temperature T4, humidity H4, and atmospheric pressure AP4 in the moving section 3, during a period from a start t5 to an end t6, after the material section 4-2.

The part PT-1 and the part PT-2 are assembled or combined with processing, in the processing section 5, and thereby the part PT-3 indicating the toner bottle is obtained. That is, as shown in a record which has a number of "5" and corresponds to processing data 52 from the processing section 5, it is shown that the part PT-3 formed with the part PT-1 and the part PT-2 receives an influence of an environment of a temperature T5, humidity H5, and atmospheric pressure AP5 during a period from a start t7 to an end t8 indicated by date-and-time information. It is shown that the part PT-3 receives an influence of the manufacturing information indicating a processing temperature in formation and the processing condition R2 such as a processing device. As shown in a record having a number of "6", it is shown that the part PT-3 receives an influence of an environment of a temperature T6, humidity H6, and atmospheric pressure AP6 in the moving section 3, during a period from a start t8 to an end t9, after the processing section 5-1.

For example, it is desirable that a time point as the start t7 starts from a time point at which at least one of the part PT-1 or the part PT-2 has been put. The date-and-time information may be provided for each part.

Further, as shown in a record having a number of "7", it is shown that the part PT-3 receives an influence of an environment of a temperature T7, humidity H7, and atmospheric pressure AP7 in the storage section 6-1, during a period from a start t9 to an end t10. As shown in a record having a number of "8", it is shown that the part PT-3 receives an influence of an environment of a temperature T8, humidity H8, and atmospheric pressure AP8 in the moving section 3, during a period from a start t10 to an end t11, after the storage section 6-1.

Next, inspection processing according to the second exemplary embodiment will be described. The inspection processing inspects a leak value of the workpiece 16 with suppressing an influence by the environment through which the workpiece 16 has been routed before an inspection.

Similar to the first exemplary embodiment, the inspection processing according to the second exemplary embodiment is performed in a manner that an inspection control program 83P illustrated in FIG. 3 is executed by the CPU 81 when power is put into the computer 80.

Firstly, in Step S100, environment information and manufacturing information of a workpiece 16 and parts of the workpiece 16 as an inspection target are acquired from the manufacturing section 7, specifically, from each of the material section 4, the processing section 5, and the storage section 6 provided in the manufacturing section 7 (see FIG. 8). In Step S100, environment information and manufacturing information of the workpiece 16 and the parts of the workpiece 16 in the moving section 3 are also acquired.

Then, in Step S102, a correction amount for correcting an influence on the leak value of the workpiece 16 in an inspection, which indicates an inspection portion of the inspection target is calculated based on the environment information and the manufacturing information in time series, which have been acquired in Step S100. The calculation is performed with the correction-amount calculation model 89 (see FIG. 4). In the second exemplary embodiment, the temperature of the workpiece 16 in the inspection is predicted and an influence of the predicted temperature on an inspection value is calculated, by using the correction-amount calculation model 89. Thus, the correction amount for correcting the influence of the environment is calculated.

The heat conduction model 89A according to the second exemplary embodiment is, for example, a thermal circuit model created based on predetermined temperature characteristics of the toner bottle. The heat conduction model is a functional unit (model) that performs a physical simulation of calculating the temperature of a workpiece 16 at a time point of an inspection by using environment information and manufacturing information in the step through which the workpiece 16 has been routed before the inspection. That is, the heat conduction model 89A predicts the temperature of the workpiece 16 in the inspection, based on temporal history of the information in the steps through which the workpiece 16 has been routed until arriving the inspection section 8. In other words, the heat conduction model 89A is a model that outputs the predicted temperature of the workpiece 16 in an inspection by using manufacturing information 82A before the inspection, environment information 82B before the inspection, and environment information in the inspection as parameters. Specifically, the heat conduction model 89A calculates the temperature of the toner bottle in the inspection by using the temperature of a storage place, the indoor temperature in the inspection, and time from carrying of the workpiece into the inspection section until the inspection is performed, as input values.

The analysis model 89B performs a calculation in a manner of analyzing a change amount from the current inspection value (leak value) to an inspection value in a case where the workpiece 16 appropriate for the environment of the inspection section 8 in the inspection has been inspected by a well-known method such as a statistical analysis. The analysis model uses the predicted temperature of the workpiece 16 and the leak value of the workpiece 16 as an inspection result. That is, the analysis model 89B performs a well-known analysis such as a statistical analysis so as to calculate the correction amount for the leak value as the inspection result, which have been changed by an influence of the temperature. In other words, the analysis model 89B is a model that outputs the correction amount for the leak value as the inspection result, which have been changed by an influence of the temperature, by using the predicted temperature of the workpiece 16 in the heat conduction model 89A and the inspection value in the manufacturing information 82D in the inspection, as parameters.

The analysis model 89B statistically analyzes a relationship between the predicted temperature T of the workpiece 16 in the inspection, the indoor atmospheric temperature Tin in the inspection, and a leak inspection value Q, so as to calculate the correction amount.

For example, in a case where a and b are set to constants, the relationship between the predicted temperature T of the workpiece 16 in the inspection, the indoor atmospheric temperature Tin in the inspection, and the leak inspection value Q may be represented by Expression (1). In a case where the relationship between the temperature T, the indoor atmospheric temperature Tin, and the leak inspection value Q is represented by Expression (1), the corrected leak value Q' may be represented by Expression (2).

$$Q=a(T-T\text{in})+b \quad (1)$$

$$Q'=Q-a(T-T\text{in}) \quad (2)$$

As described above, it is possible to calculate a leak value obtained by correcting a temperature-influenced error, by using the correction-amount calculation model 89 obtained by combining the heat conduction model 89A and the analysis model 89B.

Then, in Step S104, the leak value of the workpiece 16 is corrected by the correction amount calculated in Step S102. In Step S106, it is determined whether the leak value of the workpiece 16 is within a predetermined range, by using the corrected leak value. Then, the processing routine ends.

Figure 9:
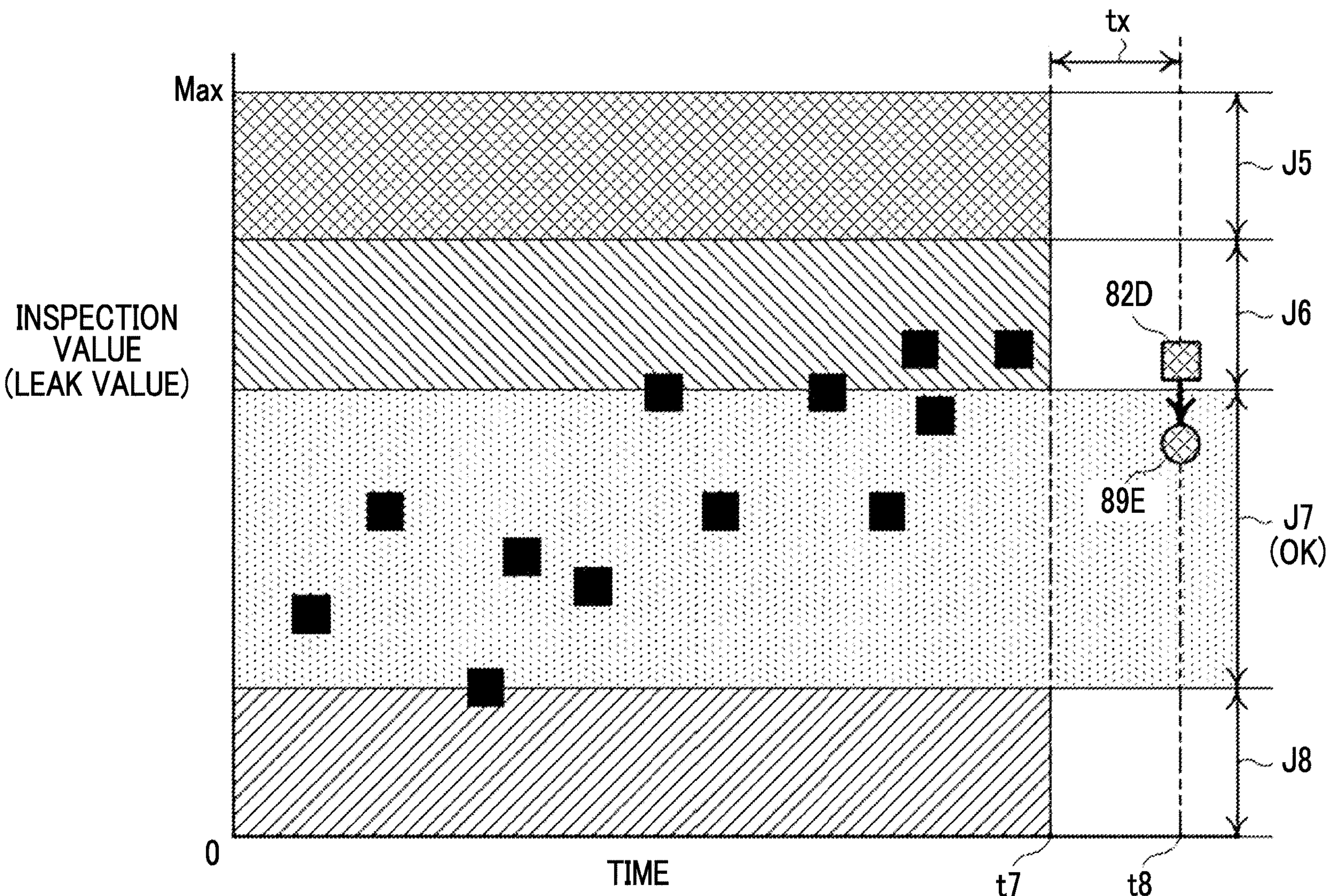
FIG. 9 is an image diagram illustrating an example of temporal characteristics regarding a leak value according to the second exemplary embodiment.

FIG. 9 illustrates an example of the temporal characteristics relating to the leak value of the workpiece 16 which is the toner bottle as the inspection target. In the example illustrated in FIG. 9, a case where the temperature of the workpiece 16 in an inspection is not appropriate in comparison to the temperature in the inspection step in the inspection section 8, that is, the temperature of the workpiece 16 in the inspection is not equal to the temperature in the inspection step will be described.

Similar to FIG. 6, ranges J5, J6, J7, and J8 relating to the leak value of the workpiece 16 in FIG. 9 indicate the inspection conditions in the manufacturing information 82D in the inspection, and correspond to determination criteria of the leak value of the workpiece 16 in the second exemplary embodiment. The range J5 indicates an inappropriate range which means that the leak value (inspection value) of the workpiece 16 is out of a predetermined appropriate range. The range J6 indicates an allowable range having a possibility that the leak value (inspection value) of the workpiece 16 is out of the predetermined appropriate range, but then is within the range by a re-inspection. The range J7 indicates the predetermined appropriate range for the leak value (inspection value) of the workpiece 16. The range J8 indicates a range having a possibility that the inspection apparatus is in an abnormal state. Thus, the workpiece 16 is accepted when the leak value (inspection value) of the workpiece 16 is within the range J7.

As illustrated in FIG. 9, the leak value of the workpiece 16 varies depending on variation of the temperature, by the environment in the steps through which the workpiece 16 has been routed until the inspection section 8. In a case where the temperature of the workpiece 16 in the inspection is not equal to the temperature in the inspection step in the inspection section 8, the leak value (inspection value) is out of the range J7. If the leak value is used as it is, the workpiece 16 is excluded from an accepted product. In the second exemplary embodiment, considering the temperature as the environmental state in the step through which the workpiece 16 has been routed before the inspection, the leak value of the workpiece 16 at an inspection time point after a time point tx is predicted, that is, the predicted leak value which corresponds to the inspection value 89E after correction, which has been obtained by correcting variation of the temperature is calculated. As described above, it is possible to correct the leak value as the inspection result with high accuracy by predicting the temperature of a workpiece 16 at an inspection time point, from history of the previous environment.

As described above, according to the second exemplary embodiment, it is possible to calculate a leak value of a workpiece 16, which is obtained by correcting a temperature-influenced error with the correction-amount calculation model 89. As described above, in the second exemplary embodiment, it is possible to inspect the sealability of the toner bottle with suppressing an occurrence of errors in measuring the amount of leaked air by an influence of pressure varying which occurs by the change of the temperature of the air in the sealed space of the toner bottle as the inspection target.

In the second exemplary embodiment, a case where the correction amount for correcting the temperature-influenced error is predicted and the leak value of the workpiece 16 in an inspection is calculated, by using the correction-amount calculation model 89, is described. However, the correction amount may be obtained by calculating a trend of the leak value varying by the variation of the temperature of the workpiece 16. The trend of the leak value corresponds to information indicating a tendency of variation of the leak value depending on the variation of the temperature of the workpiece 16.

Figure 10:
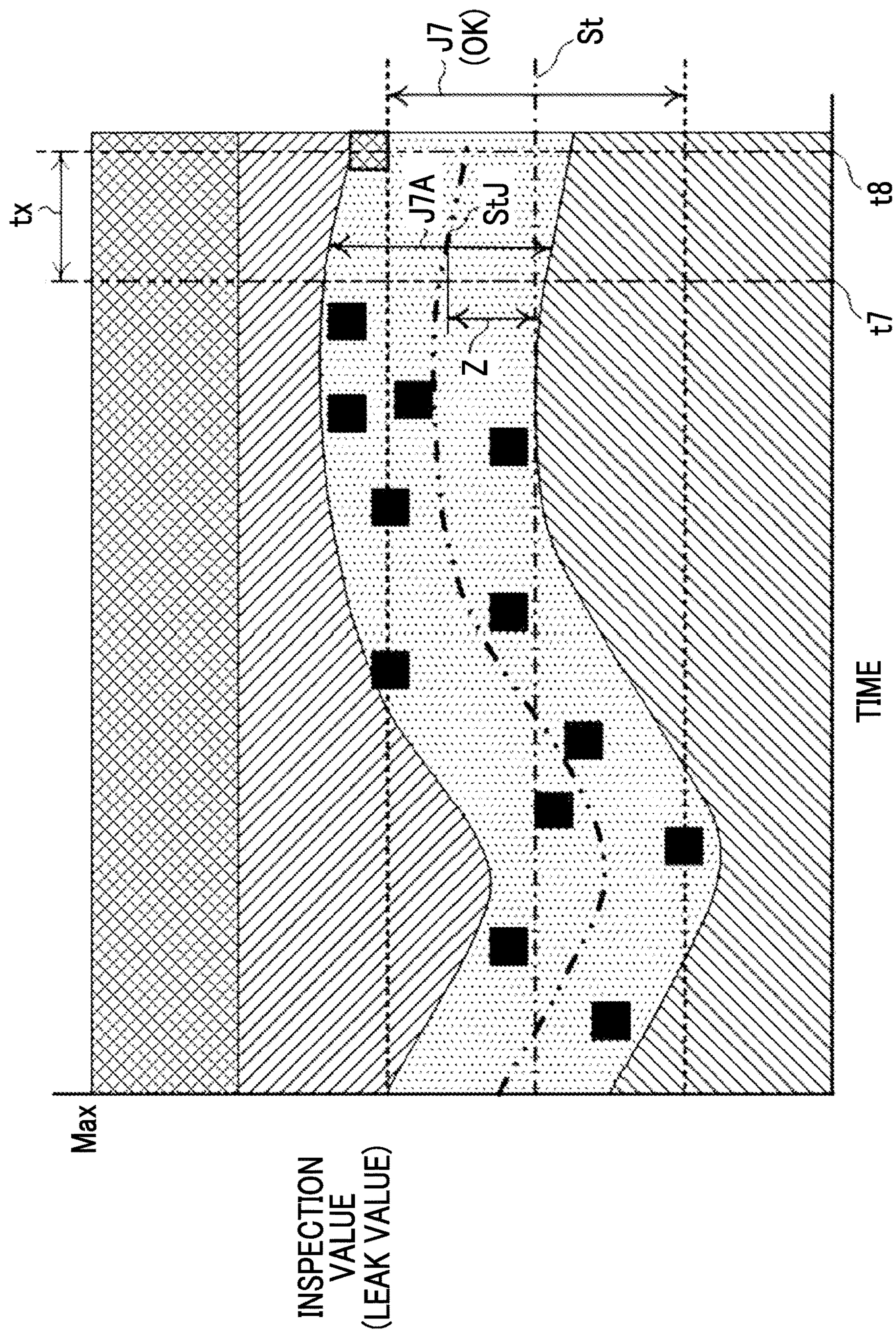
FIG. 10 is an image diagram illustrating another example of the temporal characteristics regarding the leak value according to the second exemplary embodiment.

FIG. 10 illustrates an example of the temporal characteristics relating to the leak value of the workpiece 16 depending on the variation of the temperature of the workpiece 16.

As illustrated in FIG. 10, regarding the leak value of the workpiece 16, the predetermined appropriate range J7 changes depending on the variation of the temperature of the workpiece 16. That is, the leak value of the workpiece 16 is in a variation range J7A obtained by changing the appropriate range J7 depending on the variation of the temperature of the workpiece 16 with time elapsed. Thus, it is possible to calculate the correction amount for predicting the temperature of the workpiece 16 at an inspection time point in a manner that the central characteristic in the range J7 illustrated in FIG. 9 is set as St, and a difference Z of a variation central characteristic Stj in the variation range J7A from the characteristic St is set as a correction amount.

Third Exemplary Embodiment

Next, a third exemplary embodiment will be described. The third exemplary embodiment is obtained by applying the technology in the disclosure in a case of changing a threshold of the inspection condition for determining whether or not an inspection target is accepted. The third exemplary embodiment has a configuration which is substantially similar to that of the first exemplary embodiment. Thus, the same components are denoted by the same reference signs, and detailed descriptions thereof will not be repeated. The third exemplary embodiment may be applied to the second exemplary embodiment.

In the second exemplary embodiment, a case where the correction amount for correcting the temperature-influenced error is predicted and the inspection value (dimensions) in an inspection is calculated, by using the correction-amount calculation model 89, is described. The technology in the disclosure is not limited to the case of predicting the correction amount for correcting the temperature-influenced error and calculating the inspection value in an inspection. For example, a threshold for the determination may be changed.

Next, inspection processing according to the third exemplary embodiment will be described.

Figure 11:
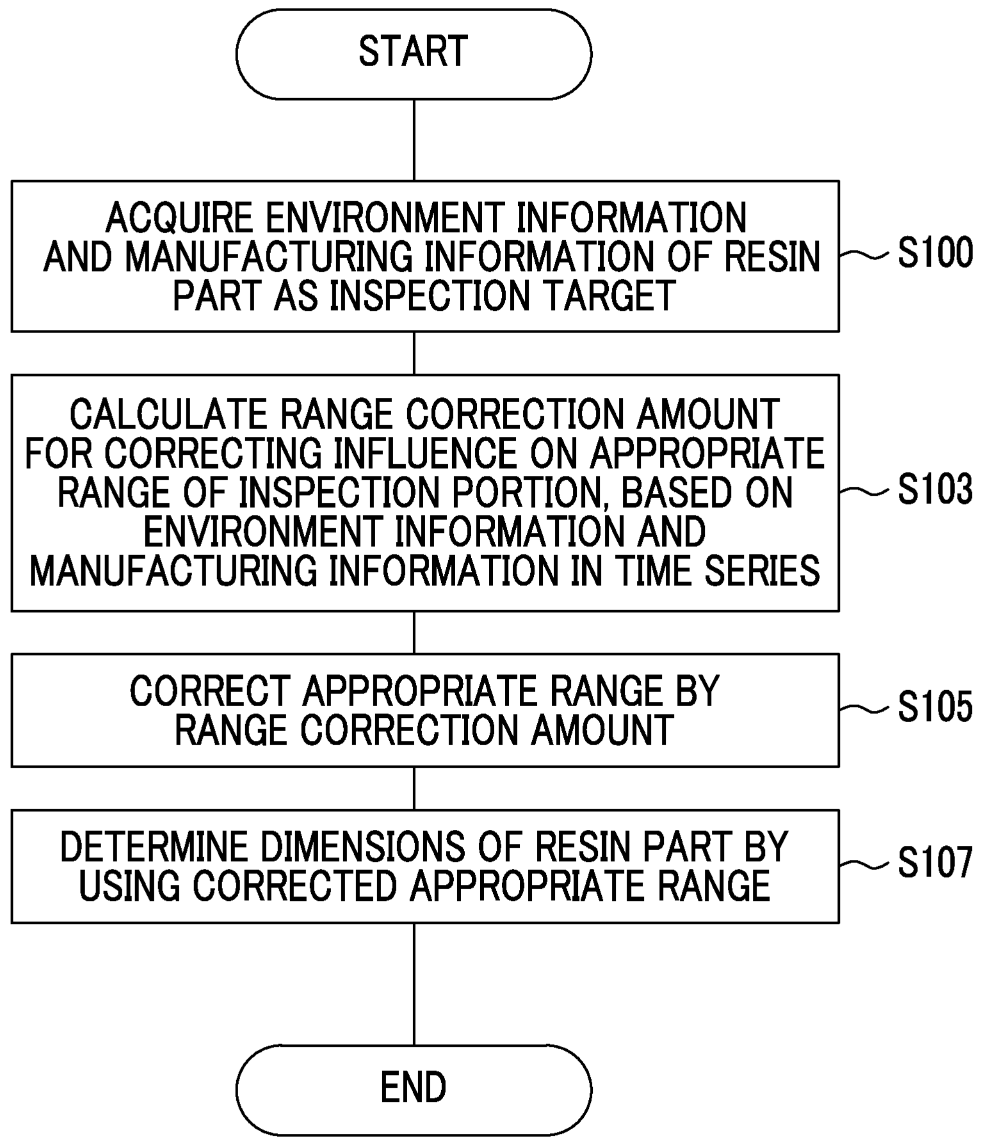
FIG. 11 is a flowchart illustrating a flow of inspection processing of inspecting the leak value of a toner bottle according to the second exemplary embodiment.

Regarding the inspection processing according to the third exemplary embodiment, processing of an inspection control program 83P illustrated in FIG. 11 is performed by the CPU 81 in the computer 80 instead of the processing of the inspection control program 83P illustrated in FIG. 3.

Firstly, in Step S100, environment information and manufacturing information of a resin part 12 are acquired from the manufacturing section 7. In Step S100, environment information and manufacturing information of the resin part 12 in the moving section 3 are also acquired.

Then, in Step S103, firstly, a variation tendency of the dimensions of the resin part 12, that is, a variation characteristic thereof is calculated in time series, based on the environment information and the manufacturing information in time series, which have been acquired in Step S100. As the variation characteristic, the central characteristic of a dimension variation of the resin part 12 may be used. The correction amount for correcting an influence on an inspection value in the inspection is calculated based on the calculated variation characteristic in time series. Then, a range correction amount for correcting an influence on an appropriate range is calculated based on the calculated correction amount. The range correction amount includes a difference of the correction amount from the central characteristic of the appropriate range J7 and a scale factor in a range from an upper limit value of the appropriate range J7 to a lower limit value thereof. That is, the range correction amount indicates a difference amount from the central characteristic of the appropriate range J7 to the central characteristic of the corrected appropriate range J7 and the scale factor in the range from the upper limit value of the appropriate range J7 to the lower limit value thereof.

Then, in Step S105, the appropriate range for the dimensions of the resin part 12 is corrected by the range correction amount calculated in Step S103. In Step S107, it is determined whether the dimensions of the resin part are within a predetermined range, by using the corrected appropriate range. Then, the processing routine ends.

Figure 12:
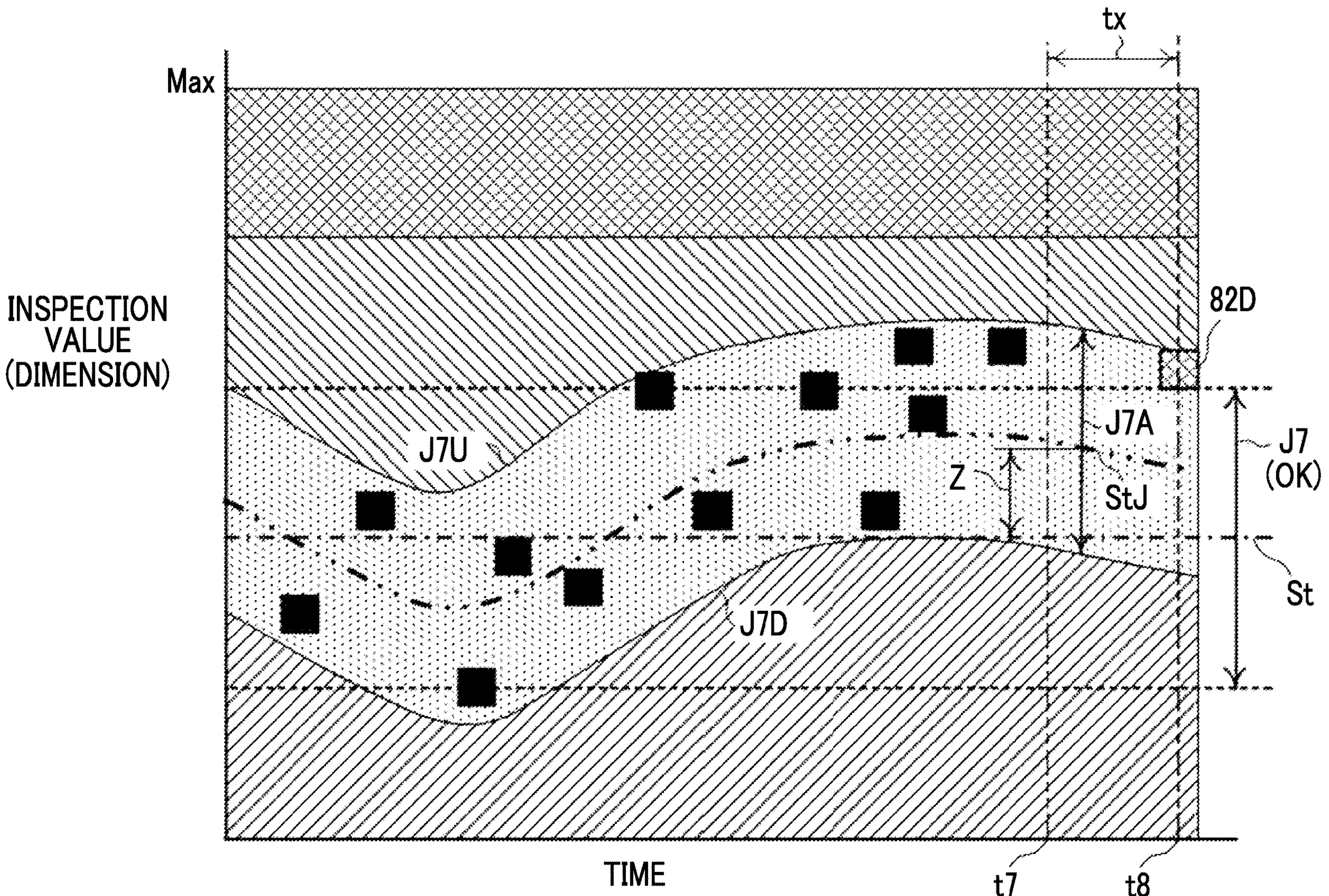
FIG. 12 is an image diagram illustrating an example of temporal characteristics regarding dimensions of a resin part as an inspection target according to a third exemplary embodiment.

FIG. 12 illustrates an example of temporal characteristics relating to the dimensions of the resin part 12 as the inspection target.

As illustrated in FIG. 12, regarding the dimensions of the resin part 12, the predetermined appropriate range J7 changes depending on the variation of the temperature of the resin part 12. That is, the dimensions of the resin part 12 are in a variation range J7A obtained by changing the appropriate range J7 of the dimensions depending on the variation of the temperature of the resin part 12 with time elapsed. Thus, it is possible to calculate the correction amount for predicting the dimensions of the resin part 12 at an inspection time point in a manner that the central characteristic in the range J7 illustrated in FIG. 12 is set as St, and a difference Z of a variation central characteristic Stj in the variation range J7A from the characteristic St is set as a correction amount. The variation range J7A has a scale factor for the appropriate range J7 in accordance with the variation central characteristic Stj. An upper characteristic J7U and a lower characteristic J7D varying by the scale factor are predicted, and a range between the upper characteristic and the lower characteristic is set as the variation range J7A. Thus, when the dimensions (inspection value) of the resin part 12 are within the variation range J7A varying from the appropriate range J7, the resin part 12 is accepted.

As described above, according to the third exemplary embodiment, the appropriate range J7 for determining whether or not the inspection target is accepted is changed with applying an influence of the temperature. Thus, it is possible to correct the temperature-influenced error and determine whether or not the dimensions of the resin part 12 are accepted. As described above, in the third exemplary embodiment, it is possible to perform an inspection with an inspection value itself, by changing the condition for the determination.

Fourth Exemplary Embodiment

Next, a fourth exemplary embodiment will be described. The fourth exemplary embodiment is obtained by applying the technology in the disclosure in a case where an instruction to change from the current environment is performed on a step before an inspection step based on the correction amount at the current time point, which has been calculated by the correction-amount calculation model 89. The fourth exemplary embodiment has a configuration which is substantially similar to that of the first exemplary embodiment. Thus, the same components are denoted by the same reference signs, and detailed descriptions thereof will not be repeated. The fourth exemplary embodiment may be applied to the second exemplary embodiment and the third exemplary embodiment.

In a case where the resin part 12 passes through a routing step before an inspection, it is possible to improve prediction accuracy for predicting an inspection value for inspecting the resin part 12 in an environment in the inspection, by considering an environment of a step before the inspection. In a case where the environment of the step before the inspection is an environment which normally differs from the environment in an inspection step, prediction accuracy of a prediction result of the inspection value may vary depending on the different environment. Thus, in the fourth exemplary embodiment, an instruction to change the environment of the step before the inspection step of a resin part 12 as the next inspection target from the current environment so as to be close to the environment in the inspection step, based on the correction amount calculated by the correction-amount calculation model 89, is performed. Thus, the prediction accuracy of the prediction result for the inspection value is improved.

Inspection processing according to the fourth exemplary embodiment will be described. In the inspection processing according to the fourth exemplary embodiment, an instruction to change the environment from the current environment so as to be close to the environment in the inspection step is further performed on a routing step before the inspection step, in Step S104 of the inspection control program 83P illustrated in FIG. 3.

For example, instruction information indicating the environment in the inspection step, for example, indicating that a difference of the temperature in a routing step from the temperature in an inspection is reduced is output to each routing step included in the inspection data 82 illustrated in FIG. 2. In each routing step, the instruction information from the inspection step is received, and processing of reducing a temperature difference is performed. Thus, in a case where the next resin part 12 is inspected, it is possible to improve prediction accuracy of the prediction result of the inspection value by suppressing a difference between the temperature corresponding to the environment in the step before the inspection and the temperature in the inspection step.

As described above, according to the fourth exemplary embodiment, the instruction to change the environment in the step before the inspection step so as to be close to the environment in the inspection step, based on the correction amount obtained by predicting the dimensions of the resin part 12 in the inspection, at the current time point is performed. Thus, the prediction accuracy of the prediction result for the next inspection value is improved.

Hitherto, the exemplary embodiments are described. However, the technical scope of the technology in the disclosure is not limited to the range in the descriptions of the exemplary embodiments. Various modifications or improvements can be added to the above exemplary embodiments within the scope without departing from the gist, and a form obtained by adding such a modification or an improvement is also included in the technical scope of the technology in the disclosure.

In the above exemplary embodiments, a case where the inspection processing is realized by a software configuration in accordance with processing using the flowchart is described. However, it is not limited thereto. For example, the inspection processing may be realized by a hardware configuration.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An inspection information prediction apparatus comprising:

a processor, configured to:

acquire environment information of a routing step among a plurality of routing steps in production routing through which an inspection target has been routed before an inspection step of inspecting the inspection target in an inspection section, wherein the plurality of routing steps is a route during a manufacturing process of the inspection target;

acquire environment information of the inspection section;

acquire manufacturing information of the inspection target in the routing step;

acquire time information from carrying of the inspection target into the inspection section until the inspection step is performed; and predict inspection information which indicates an inspection result of an inspection portion of the inspection target, wherein the prediction is based on the acquired environment information of the routing step, the acquired environment information of the inspection section, the acquired manufacturing information and the acquired time information;

acquire the inspection result via inspection and compare with the predicted inspection information.

2. The inspection information prediction apparatus according to claim 1, wherein the environment information includes predetermined physical environment information of at least one of a temperature, humidity, an atmospheric pressure, and a base point to influence the inspection result of the inspection target.

3. The inspection information prediction apparatus according to claim 2, wherein the physical environment information is associated with history information indicating a time point at which the physical environment information has been obtained.

4. The inspection information prediction apparatus according to claim 1, wherein, in a case where the inspection target passes through the plurality of routing steps, the environment information includes pieces of pass information each associating pass time-point information indicating a routing time point at which the inspection target has been routed through one of the plurality of routing steps with routing step information indicating the one of the plurality of routing steps.

5. The inspection information prediction apparatus according to claim 2, wherein, in a case where the inspection target passes through the plurality of the routing steps, the environment information includes pieces of pass information each associating pass time-point information indicating a routing time point at which the inspection target has been routed through one of the plurality of routing steps with routing step information indicating the one of the plurality of routing steps.

6. The inspection information prediction apparatus according to claim 3, wherein, in a case where the inspection target passes through the plurality of the routing steps, the environment information includes pieces of pass information each associating pass time-point information indicating a routing time point at which the inspection target has been routed through one of the plurality of routing steps associated with routing step information indicating the one of the plurality of routing steps.

7. The inspection information prediction apparatus according to claim 4, wherein the plurality of routing steps include a manufacturing step of the inspection target and a storing step of storing the inspection target.

8. The inspection information prediction apparatus according to claim 5, wherein the plurality of routing steps include a manufacturing step of the inspection target and a storing step of storing the inspection target.

9. The inspection information prediction apparatus according to claim 6, wherein the plurality of routing steps include a manufacturing step of the inspection target and a storing step of storing the inspection target.

10. The inspection information prediction apparatus according to claim 1, wherein the manufacturing information includes information indicating a structure of the inspection target and information indicating manufacturing condition.

11. The inspection information prediction apparatus according to claim 2, wherein the manufacturing information includes information indicating a structure of the inspection target and information indicating manufacturing condition.

12. The inspection information prediction apparatus according to claim 3, wherein the manufacturing information includes information indicating a structure of the inspection target and information indicating manufacturing condition.

13. The inspection information prediction apparatus according to claim 4, wherein the manufacturing information includes information indicating a structure of the inspection target and information indicating manufacturing condition.

14. The inspection information prediction apparatus according to claim 5, wherein the manufacturing information includes information indicating a structure of the inspection target and information indicating manufacturing condition.

15. The inspection information prediction apparatus according to claim 6, wherein the manufacturing information includes information indicating a structure of the inspection target and information indicating manufacturing condition.

16. The inspection information prediction apparatus according to claim 1, wherein the inspection step includes a determination step of determining whether the inspection result obtained by inspecting the inspection portion of the inspection target in a predetermined inspection condition matches with predetermined specific inspection information, and an output step of outputting correction information indicating a difference between the inspection result obtained in a case where the inspection portion of the inspection target has been inspected in the predetermined inspection condition in the inspection step and the predicted inspection information.

17. The inspection information prediction apparatus according to claim 16, wherein, in the determination step, it is determined whether the corrected inspection result matches with the specific inspection information, based on the correction information.

18. The inspection information prediction apparatus according to claim 16, wherein the correction information includes instruction information for the routing step, which indicates an instruction to change an environment in the routing step from the current environment for the next inspection target in accordance with the correction information.

19. An inspection apparatus comprising:

the inspection information prediction apparatus according to claim 1; and the inspection section that inspects the inspection portion of the inspection target in the inspection step of performing an inspection in a predetermined inspection condition.

20. A non-transitory computer readable medium storing an inspection information prediction program causing a computer to execute a process, the process comprising:

acquiring environment information of a routing step among a plurality of routing steps in production routing through which an inspection target has been routed before an inspection step of inspecting the inspection target in an inspection section, wherein the plurality of routing steps is route during a manufacturing process of the inspection target;

acquiring environment information of the inspection section;

acquiring manufacturing information of the inspection target in the routing step;

acquiring time information from carrying of the inspection target into the inspection section until the inspection step is performed; and predicting inspection information that indicates an inspection result of an inspection portion of the inspection target, wherein the prediction is based on the acquired environment information of the routing step, the acquired environment information of the inspection section, the acquired manufacturing information and the acquired time information;

acquiring the inspection result via inspection and comparing with the predicted inspection information.

* * * * *